United States Patent [19]
Fraser et al.

[11] Patent Number: 5,019,842
[45] Date of Patent: May 28, 1991

[54] EXTENDABLE SHADE IN INSTANT CAMERA FOR PROTECTING FILM UNIT FROM AMBIENT LIGHT

[75] Inventors: Richard J. Fraser, Franklin; Kenneth J. Launie, Cambridge, both of Mass.

[73] Assignee: Polaroid Corporation, Cambridge, Mass.

[21] Appl. No.: 459,342

[22] Filed: Dec. 29, 1989

[51] Int. Cl.⁵ .......................................... G03B 17/50
[52] U.S. Cl. ..................................................... 354/86
[58] Field of Search .................. 354/83, 85, 86, 288, 354/87

[56] References Cited
U.S. PATENT DOCUMENTS

| | | | |
|---|---|---|---|
| 3,460,452 | 8/1969 | Land | 354/86 |
| 3,810,211 | 5/1975 | Wareham et al. | 354/86 |
| 3,940,774 | 2/1976 | Ivester | 354/83 |
| 4,688,912 | 8/1987 | Johnson et al. | 354/86 |
| 4,774,535 | 9/1988 | Whiteside | 354/86 |
| 4,839,676 | 6/1989 | Lippert et al. | 354/86 |

Primary Examiner—Brian W. Brown
Attorney, Agent, or Firm—Alfred E. Corrigan

[57] ABSTRACT

A instant camera of the type which receives film assemblages having stacked film units of the self-developing type. The camera is provided with a pair of spread rollers which engage an exposed film unit to spread a processing liquid between layers of the film unit while simultaneously moving it into a storage chamber having a viewing window. An opaque shade for the window is located adjacent the exit side of the spread rollers. The shade is adapted to be moved into covering relationship to the window and/or the exposed film unit for a predetermined period of time after it exits from the bite of a pair of spread rollers and then returned to its noncovering position. This time is sufficient to allow a treated portion of the film unit to remain in the dark unit its length reaches a predetermined value. At this length there will no longer be any danger of actinic light being piped along the length of the film unit until it reaches an untreated portion of the film unit that is still at the entrace side of the spread rollers.

10 Claims, 3 Drawing Sheets

EXTENDABLE SHADE IN INSTANT CAMERA FOR PROTECTING FILM UNIT FROM AMBIENT LIGHT

BACKGROUND OF THE INVENTION

1. Field of the Invention

This invention relates to an instant camera for use with a film assemblage having self-developing film units which are processed in the camera by means of a pair of spread rollers. The rollers spread a processing liquid between elements of an exposed film unit while simultaneously moving it into a storage chamber having a viewing window.

2. Description of the Prior Art

One of the problems encountered in the prior art with instant cameras and cooperating film assemblages of this general type is known in the art as "light-piping". This phenomenon is explained in detail in U.S. Pat. No. 3,810,211 in connection with a layered film unit of the self developing type common in the art. More specifically, light-piping relates to ambient light incident upon a portion of a transparent layer of a film unit located on the exit side of a pair of spread rollers during film processing operations in the camera. Conventionally, an exposed film unit is discharged from a camera through a pair of rollers which spread a processing liquid between layers of the film unit. The processing liquid treats the film unit to initiate development of the latent image. During the movement of the film unit through the rollers the film unit includes both treated and untreated portions. Light rays may travel longitudinally along the front or transparent layer of the film unit and may cause undesirable "fogging" of those yet untreated sections of the film unit's photosensitive layer which are located upstream of the rollers.

To understand this phenomenon more clearly, it should be recognized that the aforementioned film unit as described in said patent comprises a photosensitive layer, an image receiving layer, a transparent outer layer through which the photosensitive layer can be photoexposed, a first opaque layer in a position on the side of the photosensitive layer distant from the transparent layer and an opacifying system comprising titanium dioxide capable of being spread between the transparent outer layer and the photosensitive layer to form a second opaque layer during development, the opaque layers being in positions such that an image formed in the image receiving layer can be viewed without separation of the layers of the film unit, and in which the first and second opaque layers prevent fogging of the photosensitive layer by light incident on them, and in which the outer transparent layer contains pigment, e.g., carbon blacks including graphites, in an amount insufficient to prevent transmission of substantially all the light incident on the layer during photoexposure of the film unit but sufficient to reduce substantially or prevent fogging during formation of the second opaque layer in areas of the photosensitive layer where the second opaque layer has not been formed and caused by transmission of light through the film unit from areas where the second opaque layer has been formed. Thus, once the processing liquid including its opacifying constituent has been spread across the photosensitive layer, that photosensitive layer is protected from ambient light incident upon the film unit, and its development process may therefore be completed when the fiml unit itself is exposed to ambient light. However, in the aforementioned camera arrangement of said paten, a liquid treated section of each such film unit is exposed to ambient light while a section thereof remains on the opposite side of the spread rollers within a light protected chamber of the camera and is yet untreated with the processing liquid. While at such times ambient light incident upon the transparent layer of the liquid treated section of the film unit cannot pass through the layer of processing liquid to underlying portions of the exposed photosensitive layer, a portion of these light rays may be reflected internally of the transparent layer and scatter or diffuse length-wise therealong into the light protected camera chamber until it reaches a point within the transparent layer beyond the rollers adjacent an underlying, untreated portion. Since there is no processing liquid containing the opacifying agent intermediate the light transparent layer and the adjacent portion of the exposed photosensitive layer at this point, these light rays may have the effect of further exposing or "fogging" the yet untreated section of the photosensitive layer. Thus, the transparent layer (e.g. Mylar) is provided with its own opacifying system. During manufacture, this transparent layer has a quantity of, e.g., carbon black, dispersed therein in an amount which will help to obviate the light-piping problem without adversely affecting the normal photographic exposure of the underlying photosensitive layers. To fully obviate the light-piping problem it is still necessary to keep the processing liquid treated portion of an exposed film unit in the dark until the length of such treated portion reaches a value, e.g., one and one-half (1½) inches, as measured from the bite of the spread rollers to the end of the transparent layer located on the downstream side of the spread rollers. Thus, the camera described in the '211 patent has a dark chamber on the exit or downstream side of the rollers to enable a predetermined length of the exposed film unit to be treated with the processing liquid before the leading end of the film unit exits from the camera and is struck by the ambient light. Now, the ambient light starts to travel or pipe along the length of the exposed film unit in the direction of the untreated portion. However, it is believed that by the time it has travelled the aforementioned length, the carbon black has absorbed sufficient light to reduce its energy to a level whereat it is substantially no longer actinic to the untreated portions of the film unit's photosensitive layer. The length of such treated portion before exiting into an area containing such light would obviously be a function of the percentage of carbon black in the transparent layer, i.e., the lower the percentage the greater the length.

The above-described solution to this light-piping problem is further described in U.S. Pat. No. 3,810,211. According to this patent, the light transmissive layer of each film unit is provided with an opaque pigment to preclude adverse fogging of exposed unprocessed sections of the film unit's photosensitive system due to light-piping. In addition, this patent provides a light shielding plate intermediate the spread rollers and an exit opening for deflecting each film unit as it emerges from the spread rollers and for light shielding a liquid treated portion of the film unit intermediate the camera's exit opening and the rollers until its treated length reaches a predetermined value as it exits from the camera. No storage chamber with a viewing window is provided in this camera.

Another proposed solution to this problem is described in U.S. Pat. No. 3,940,774 as comprising a coiled sheet of opaque material which progressively covers an exposed film unit as it exits from the camera to provide the film unit with just a second more of dark time to prevent the, as yet, non-treated trailing end of the film unit which is still on the entry side of the spread rollers from being fogged. In this camera there is no storage chamber with a window for viewing the developed film unit while it is in the chamber.

In U.S. Pat. No. 3,460,452 there in described the use of a coil of opaque material to protect an exposed film unit from ambient light. However, with this arrangement, the coil is uncoiled by an exposed film unit as it moves during its exposure but this has nothing to do with meeting the problem of light-piping since at this time the spreading of the film processing liquid has not occurred.

This invention is applicable to instant cameras and associated film assemblages of the general type disclosed in U.S. Pat. Nos. 4,774,535 and 4,839,676. However, the problem of light-piping is not present in the camera of U.S. Pat. No. 4,774,535 since an exposed film unit being developed moves from the lighttight area of the camera into a lighttight imbibition chamber for further development, and from which it can be advanced to the exterior of the camera. This chamber is provided with a window through which the developed film can be viewed and an opaque curtain or blind covers the window during the developing period so as to make the chamber lighttight. The blind is releasably maintained in light blocking or covering position at which time the exposed film cannot be viewed but when released, permits viewing through the window of the image in the exposed film. With this arrangement it is necessary to keep the viewing window covered by the blind during the developing process so as to maintain lighttight conditions in the chamber.

The light-piping problem is also not present in the camera of U.S. Pat. No. 4,839,676. This patent discloses a lighttight storage and imbibition chamber which receives exposed film units from rollers, which had previously spread the developing liquid, and in which the developing occurs and from which the film unit can exit from the camera. This chamber has a viewing window in one wall which is covered by a blind during the developing of the film unit in the storage and imbibition chamber. But after a complete developing period, the blind can be opened. With this arrangement also it is necessary to keep the blind over the viewing window during the complete developing process to maintain required lighttight conditions during film developing.

SUMMARY OF THE INVENTION

This invention is applied to the loading door of an instant type camera of the type disclosed generally in said U.S. Pat. Nos. 4,774,535 and 4,839,676. That type of camera includes a housing enclosing a film chamber having structure for locating and supporting a film assemblage in position for the sequential exposure of a plurality of film units located therein.

Each film unit includes a plurality of layers including an opaque support, a photosensitive layer, a transparent image-receiving layer which may be superposed on the photosensitive layer such that exposure may be made through that transparent layer, and a rupturable pod of processing liquid located at one end of the film unit. After exposure, the film unit is subjected to pressure rollers which rupture the pod and spread the processing liquid between layers of the film unit to initiate the formation of a visible image within the film unit.

According to the present invention the spread rollers move the film unit directly into a storage chamber formed in part by a loading door. This door has a viewing window for viewing the image in the film unit. After the image has been developed, the film unit may be stored in the chamber or be moved through an egress from the chamber. This window is normally uncovered but is adapted to be partially or fully covered by a shade or blind during the time required for a portion of the image area of the film unit to emerge from the rollers to a position over the window. The partial or full covering of the viewing window occurs automatically for a sufficiently long interval to keep the treated portion of the exposed film unit in the dark until it reaches a predetermined length where the film unit will not be subject to light-piping. This is accomplished by having an expandable opaque shade or blind mounted on the loading door directly adjacent the window and normally held in non-covering relationship to the window. However, upon emerging of the film unit from the spread rollers, as the processing liquid is spread, the shade or blind is located in covering relationship thereto and/or the window until a predetermined length of the film unit has emerged from between the rollers. After this length has been reached, the untreated portion of the latent image will no longer be affected by light entering the storage chamber. Means is provided for automatically returning the blind to its original non-covering relationship to the window so that the developing image on the exposed film unit can be viewed. Thus, this arrangement prevents light actinic to the latent image of the exposed film unit from being piped along the length of the film unit until it reaches that portion of the film unit that is still on the entrance side of the spread rollers where it may possibly fog the underlying surface of the film unit's photosensitive layer.

An object of the invention is to provide a self-developing or instant camera with an imbibition chamber in which an exposed film unit may remain during the formation of a visible image therein, the chamber including a window for reviewing the developing image and the camera including a window shade for preventing adverse fogging of untreated portions of the exposed film unit by ambient light being piped along its length.

Another object of the invention is to provide an instant camera of the type described with a window shade which only covers a portion of the window in the camera's imbibition chamber as a leading end portion of the exposed film unit emerges from between a pair of processing liquid spread rollers.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

The best modes contemplated in carrying out this invention are illustrated in the accompanying drawings in which.

DETAILED DESCRIPTION OF THE INVENTION

Figure 1:
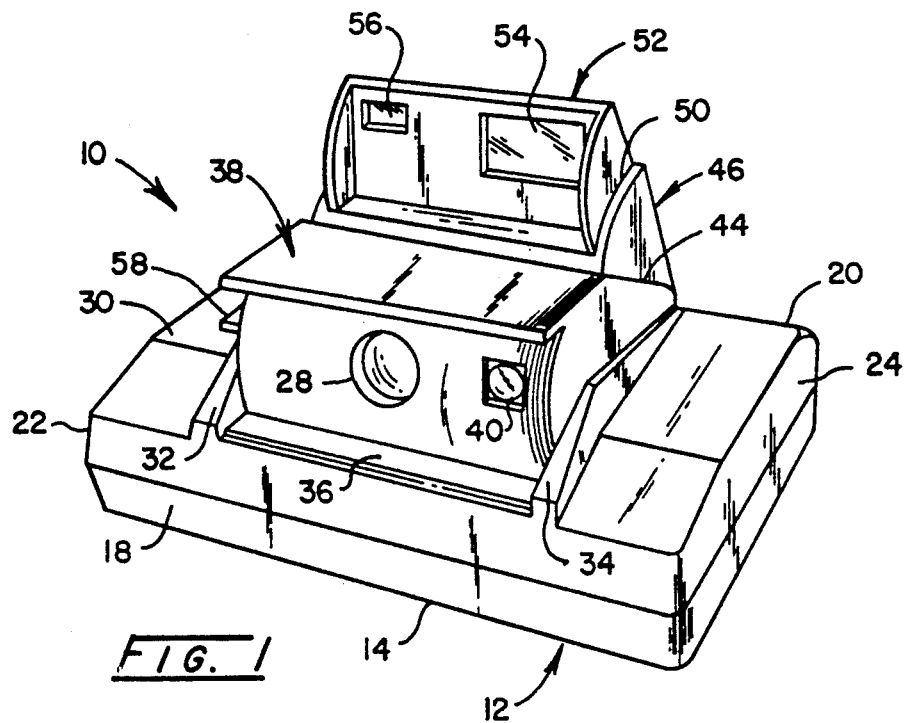
FIG. 1 is a perspective view of a foldable self-developing or instant camera in which an alternative form of the invention is incorporated, the camera being shown in its erected operative condition.
Figure 2:
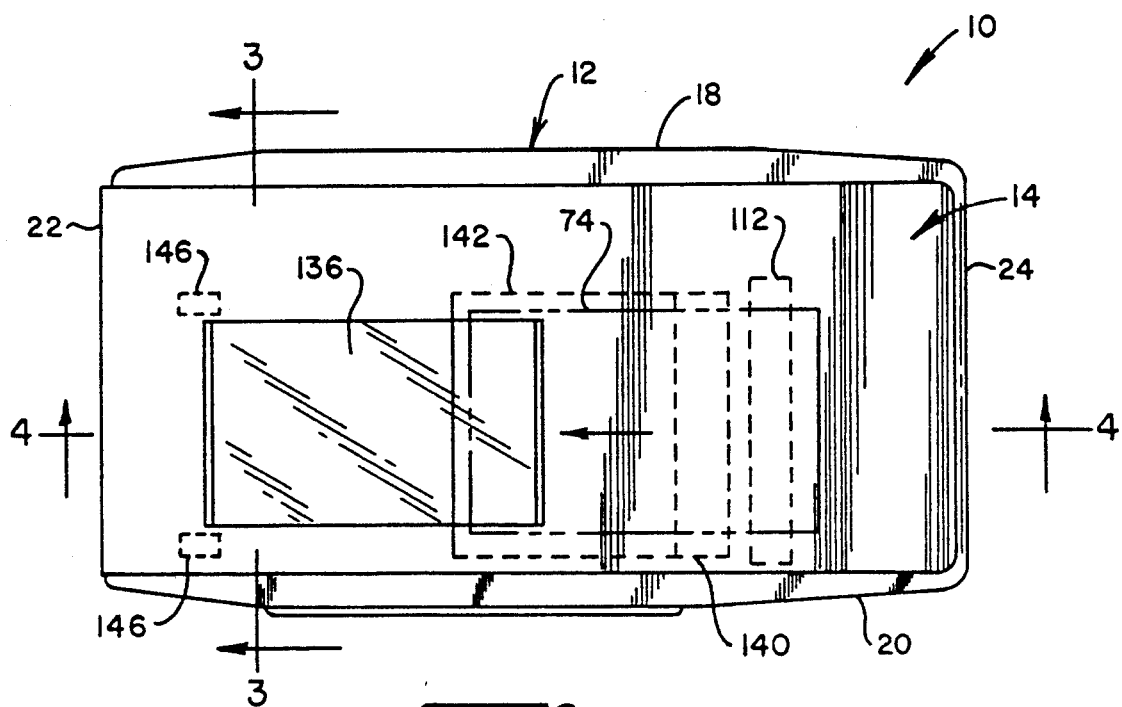
FIG. 2 is a bottom view of the camera showing its viewing window.

With speical reference to the drawings, and in particular to FIGS. 1 and 2, there is shown a folding camera 10 of the instant or self-developing type of the general type disclosed in U.S. Pat. Nos. 4,774,535 and 4,839,676. Note should be taken at this time that although the invention is described in relation to a folding camera, the invention is equally applicable to a non-folding camera. The camera 10 includes a first or main housing 12 having a loading door 14 at the bottom thereof. The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

The camera 10 further includes a second housing 38 which is pivotally coupled to the first housing 12 about an axis (not shown) which is generally parallel with the rear wall 20 for movement between an inoperative position wherein it is nested within the recess 36, and its operative position shown in FIG. 1. The second housing 38 supports the aforementioned objective lens 28, a shutter assembly, and a photocell window 40. A top wall of the second housing includes a recess 44 which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source of artificial illumination such as a strobe 54 and a ranging window 56. The fourth housing 52, as well as the second and third housings 38 and 46, is biased into the erect position shown in FIG. 1. Further, the fourth housing 52 is adapted to be nested within the recess 50 prior to the third housing 46 being moved into the recess 44 during folding of the camera.

When the various housings are in the positions shown in FIG. 1, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit.

Figure 3:
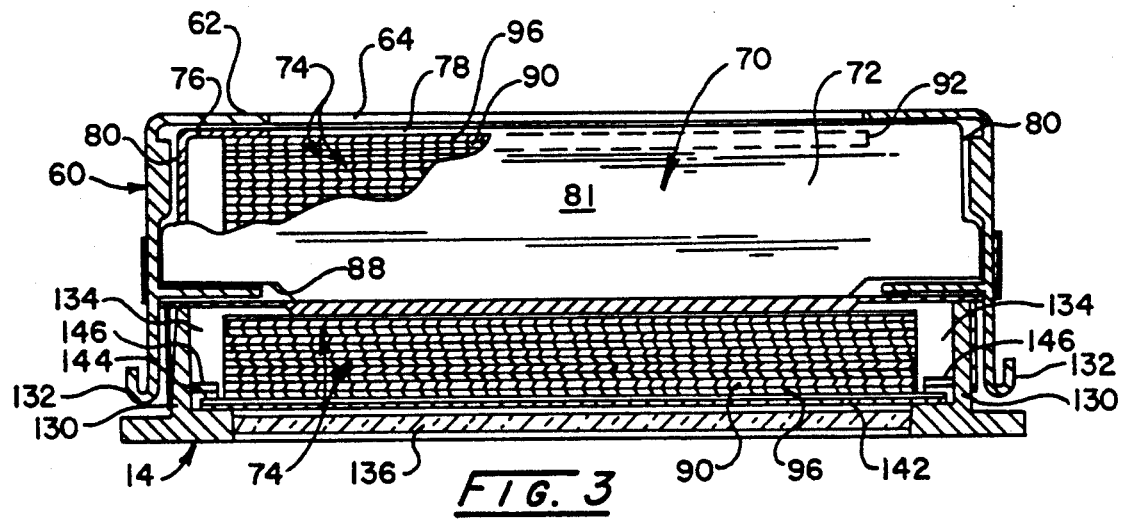
FIG. 3 is a transverse section taken along line 3—3 of FIG. 2 showing a stack of developed film units in the storage chamber.

The camera 10 includes a film chamber 60 (FIG. 3) which is accessible via the loading door 14. The film chamber 60 is adapted to receive a film assemblage 70 as shown in U.S. Pat. No. 4,839,676. The film chamber 60 is defined in part by a horizontal wall 62 which functions to locate a film cassette 72 of the assemblage 70 in position for the sequential exposure of a plurality of film units 74 stacked therein. These film units are of the integral self-developing or instant type as previously described.

The film assemblage 70 includes, in addition to the film cassette 72 and the film units 74, biasing means (not shown) for resiliently urging the stack of film units 74 toward an upper or forward wall 76 of the film cassette 72. The forward wall 76 of the cassette is provided with a generally rectangular shaped exposure aperture 78 which is adapted to be located in alignment with a correspondingly shaped aperture 64 located in the wall 62 of the film chamber 60. The forward wall 76 cooperates with a pair of parallel side walls 80, a trailing end wall 81, an opposite leading end wall (not shown) and a bottom wall 88, to define a chamber in the cassette for receiving the stack of film units 74. The aforementioned biasing means (not shown) is located between the bottom wall 88 as disclosed in U.S. Pat. No. 4,774,535 and an adjacent bottom endmost film unit 74 so as to urge the top endmost film unit 74 in the stack against the interior surface of the forward wall 76 with (1) its photosensitive layer 90 located in alignment with the exposure aperture 78, (2) its leading end located in position to be moved through an elongated egress 92 in the cassette's leading end wall, and (3) its trailing end located adjacent the trailing end wall 81. The leading end of each film unit 74 is provided with a pod or container 94 of processing liquid (see FIG. 4) and the trailing end of each film unit is formed with a trap 98 for receiving any excess processing liquid. Each film unit 74 includes in addition to the photosensitive layer 90, a light transmissive layer 96 which is uppermost (FIG. 3) when the unit is in the cassette, an image receiving layer 90 located between the layers 90 and 96, and an opaque layer which is lowermost.

Figure 5:
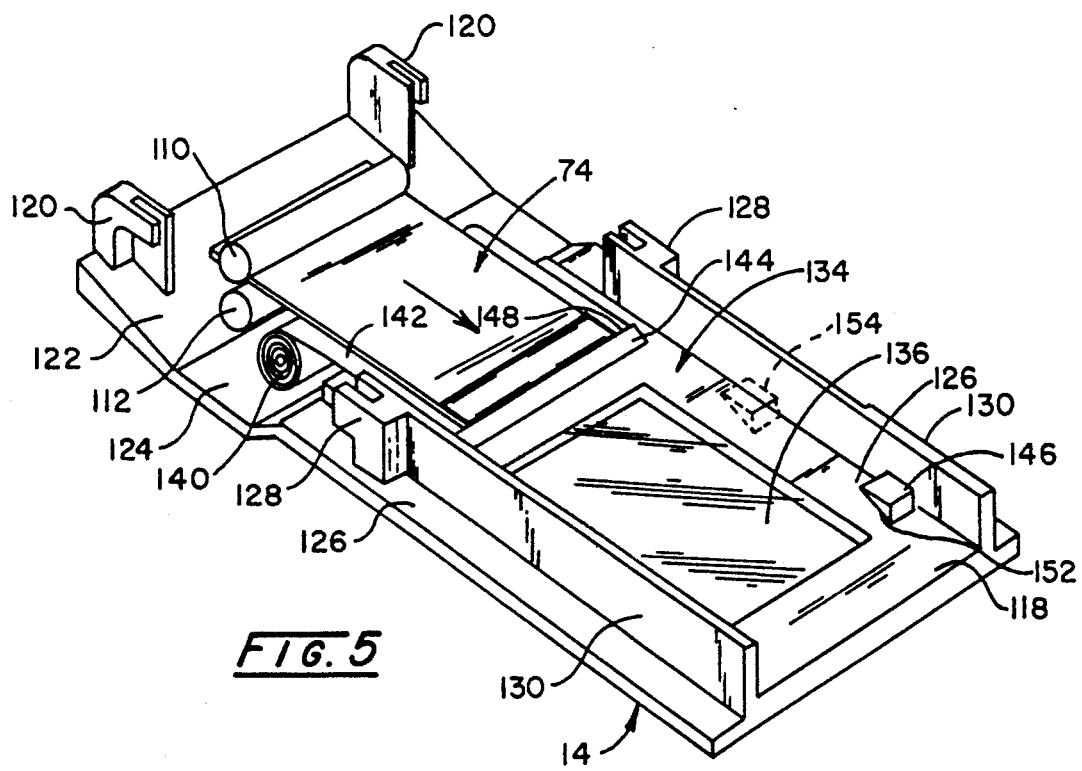
FIG. 5 is a perspective view of the upper side of the loading door of FIG. 4.

Means is provided in the camera as shown in U.S. Pat. No. 4,774,535 for driving a film advancing member to move an exposed film unit 74 from the cassette 72. The film unit is then guided to a pair of spread rollers 110 and 112 which are located near the end of the loading door 14 opposite to its hinged connection to the end wall 22. Each film unit leaves the cassette 72 with its light transmissive layer 96 uppermost, travels in one direction horizontally and then is inverted and reversed to travel in the other direction horizontally with its layer 96 lowermost until it is moved into the bite of spread rollers 110 and 112 as shown in FIG. 5.

The loading door 14 is formed with a pair of laterally-spaced upstanding lugs 120 at one end which are on an inclined flange 122 at that end which joins with a flat section 124 of the door which is recessed below a main flat area 126 of the door. Forwardly of section 124 on the area 126 are two upstanding latch-receiving lugs 128 which receive depending spring latches 132 (FIG. 3) depending from the wall 62 in the housing 60. These lugs 128 are at the inner ends of a pair of parallel upstanding flanges 130 which are laterally spaced and extend to the end of the camera where the camera's film egress door (not shown) is located. Thus, there is provided a storage and imbibition chamber 134 for exposed film units 74 between the flanges 130 and this chamber may be opened or closed by the egress door.

Figure 4:
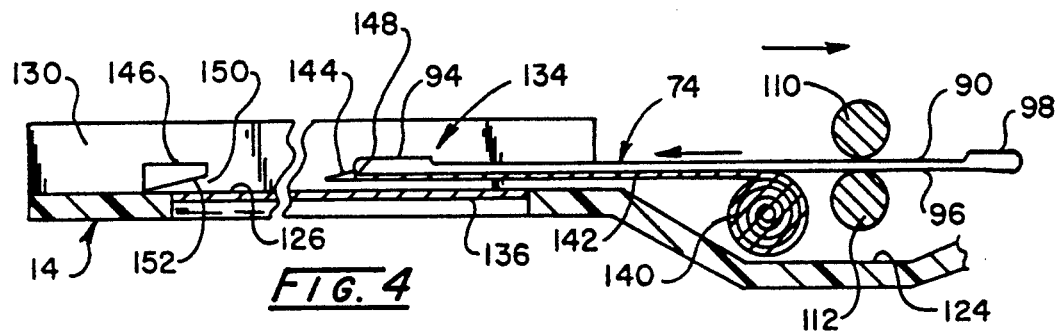
FIG. 4 is a partial longitudinal sectional view through the camera loading door along line 4—4 of FIG. 2 showing how one form of the invention is applied thereto.

Means is provided according to this invention to prevent light-piping through the developing film unit 74 longitudinally from ambient light which enters the chamber 134 via the viewing window 136 at the time a film unit 74 may still have an untreated trailing end in the spread rollers 110 and 112. This window 136 is provided adjacent an end 118 of the chamber 134 and is spaced forwardly from spread rollers 110 and 112 a distance less than the length of film unit 74 with the result that the leading end of the film unit will reach the window 136 before its trailing end leaves the bite of spread rollers 110 and 112. As shown in FIG. 4, the storage chamber 134 will receive the exposed treated film units from the spread rollers 110 and 112 and successive film units will be guided and stacked over the window and under a previously positioned film unit as indicated in U.S. Pat. No. 4,774,535 and then be removed as desired by a reciprocable film advancing plate (not shown) like that disclosed in U.S. Pat. No. 4,774,535, or they may simply be removed manually by opening the egress door and grasping the end of the film unit.

The exposed film unit 74 is advanced by suitable means (not shown), which may be of the type shown in U.S. Pat. No. 4,774,535, into the bite of the spread rollers 110 and 112. These rollers are suitably supported for rotation and are driven in a manner described in said patent by an electric motor (not shown). This motor is energized for a suitable period of time when the button 58 is pushed to move the film unit 74 completely through the spread rollers 110 and 112 and into the storage chamber 134. As the film units enter the storage chamber 134, they are moved successively onto guide ramps (not shown) so that they will be stacked in the storage chamber in the manner disclosed in U.S. Pat. No. 4,839,676. From that chamber the lowermost film unit can be viewed through window 136 and can be removed therefrom by a manual or automatic film advancing means through the egress opening in the end wall 22.

It will be noted from FIG. 5 that the spread rollers 110 and 112 are disposed directly above the recessed section 124 of the loading door 14. As previously indicated, means is provided for covering the window 136 as the film unit 74 leaves the spread rollers 110 and 112. This means, which is an alternative embodiment of the invention, includes a roll or coil 140 formed of opaque strip material which is mounted in the recessed area of the loading door 14 directly adjacent to and parallel with the roller 112. This roll 140 may be formed of a material of the type disclosed in U.S. Pat. Nos. 3,460,452 and 3,940,774 but preferably will have inherent resiliency when rolled into a coil on a mandrel that will resist unwinding or alternatively a spring arrangement may be suitable supported for rotation in the recessed part of the loading door. The coil 140 of opaque material is formed from a strip and is normally in its rolled-up position in non-covering relationship to the window 136. However, it can be unrolled into a flat blind or curtain 142 that partially or completely covers the window 136. This occurs during the time the treated film unit 74 still has an untreated trailing end portion extending rearwardly from the bite of the spread rollers 110 and 112 as shown in FIGS. 4 and 5. This window-covering curtain 142 will prevent light in the chamber 134 from striking the layer 96 and then flowing longitudinally in the film layer 96 to a position adjacent an untreated portion of the photosensitive layer 90 where it may cause fogging of the latent image.

As indicated, the rollers 110 and 112 are driven by an electric motor which is energized for a suitable interval by pushing the button 58 and at the same time the film advancing means and two pairs of edge rollers (not shown) act to position the leading end of the exposed film unit 74 in the bite of the spread rollers 110 and 112. As the leading end of the film unit 74 emerges from the rollers 110 and 112, it passes over the coil 140 and engages an upstanding transverse shouldered lip portion 144 provided on the leading end of the curtain 142. In the normal inoperative position of the coil 140, the lip portion 144 will extend radially above the coil in position to be engaged by the leading end of the film unit 74. After engagement with lip 144, the leading end of the film unit 74 will continue to uncoil the opaque curtain 142 from the coil 140 as it continues to move toward and over the window 136. This unwinding of the coil 140 will continue until the lip 144 at the leading end of the curtain 142 strikes cams 146 adjacent the outer ends of upstanding flanges 130.

It will be noted (FIG. 4) that the lip 144 has a shoulder 148 engaged by the leading end of the film unit 74 and the lip 144 is downwardly tapered to enter a receiving mouth 150 provided by the downwardly inclined surface 152 at the lower side of the cams 146 in cooperation with the adjacent flat surface 126 of the loading door 14. Thus, when the leading end 144 of the blind or curtain 142 contacts the cam surfaces 152, it will be deflected downwardly to disengage it from the leading end of the film unit 74 to allow the curtain to rewind automatically into the coil 140. The curtain 142 (FIGS. 2 and 3) is wider than the film unit 74 so it will engage the cams 146 but the film unit will not. If it is desired for the curtain 142 to cover only a part of the window 136, the cams 146 may be located further towards rollers 110 and 112, for example, in the position indicated by dotted lines at 154 in FIG. 5. In either case, the window 136 and film unit will be covered for a sufficient period that light-piping will no longer affect the untreated part of the film unit 74. However, it is important that the curtain not be released as long as there is any chance that the distance between the point at which the transparent top layer is struck by light and the bite of the rollers is less than the aforementioned predetermined distance.

Figure 6:
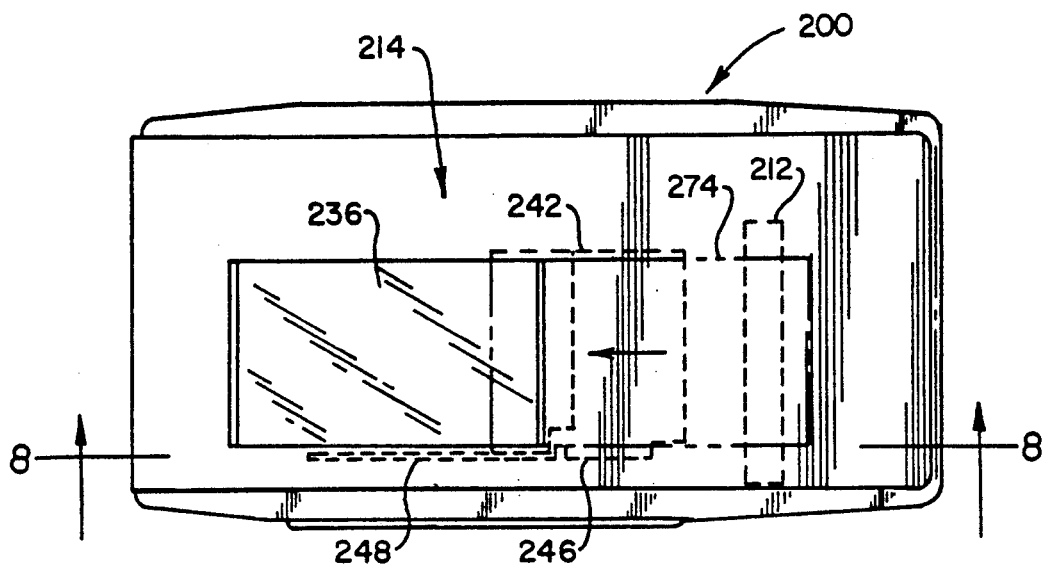
FIG. 6 is a bottom view of the camera showing a preferred form of this invention applied thereto.
Figure 7:
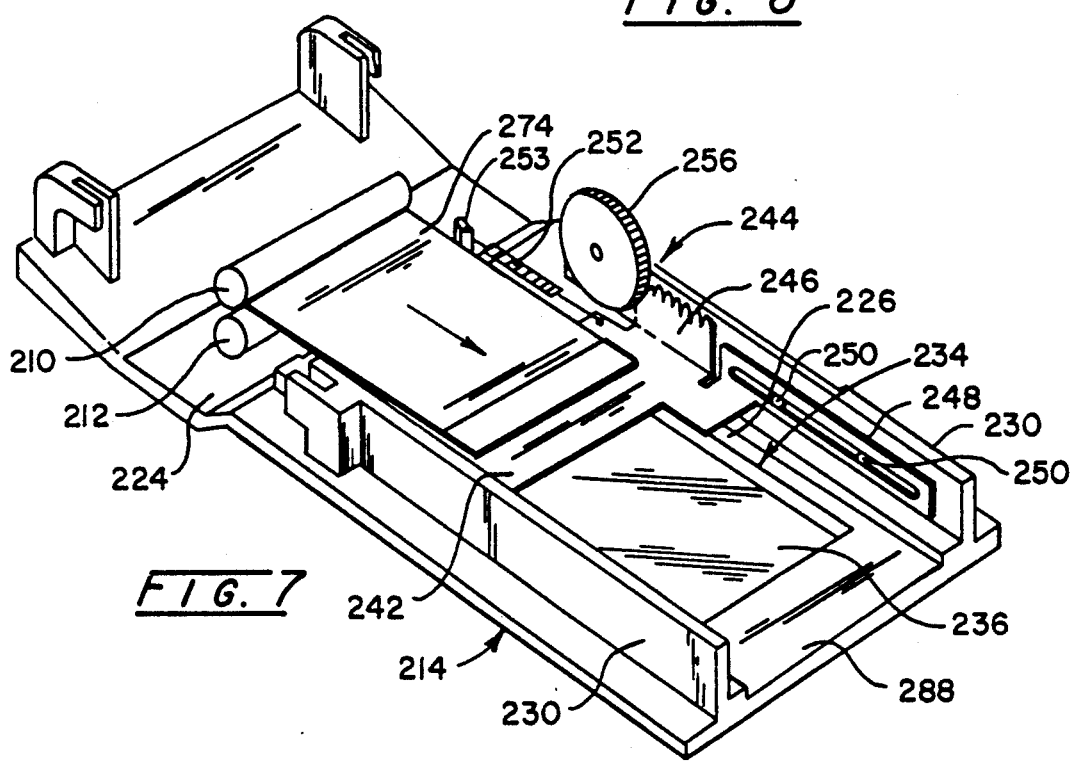
FIG. 7 is a perspective view of the upper side of the loading door of FIG. 6.
Figure 8:
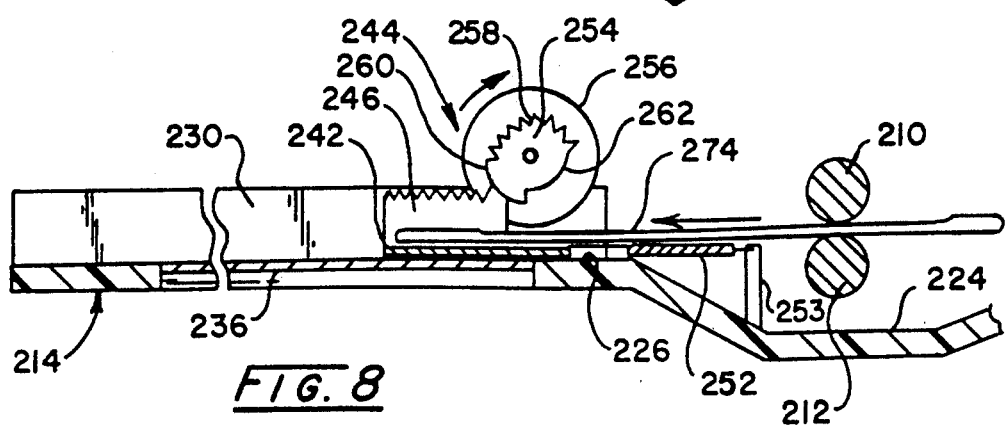
FIG. 8 is a partial sectional view taken along line 8—8 of FIG. 6 through the loading door with the preferred embodiment of the invention applied thereto.

A preferred embodiment of the invention is illustrated in FIGS. 6 to 8. Here, the invention is applied to a camera of the type previously discussed and indicated generally at 200 with a loading door 214. The door 214 has the preferred form of this invention supported thereby. Spread rollers 210 and 212 are provided as before and are mounted on the loading door 214 as before above a recessed area 224. The loading door has a window 236 positioned as before and its outer end 288 leads from a storage chamber 234 which receives the treated film units 274 after they leave the spread rollers 210 and 212 to an egress (not shown).

In this instance, to partially cover the window 236 for a limited period of time a reciprocable flat blind or curtain 242 of opaque material is mounted adjacent the main flat area 226 of the door 214. This blind is of less area than the window 236, being shown as less than one-half the area in FIG. 8 so it will cover only part of the window 236 when it moves into position over it. However, it could be of sufficient area to cover the entire window but in that case would take up much needed space when in a normal light unblocking position relative to the window 236. Reciprocation of the blind 242 is accomplished by a gear and rack unit indicated generally at 244. This unit includes an integral rack 246 upstanding from the blind 242 which is disposed laterally just within the adjacent upstanding door flange 230 for reciprocation relative thereto. The blind 242 also carries an integral guide 248 which extends along the flange 230 and has a longitudinal slot for receiving guide pins 250 extending from the flange 230. A spring 252 normally pulls the blind 242 to its inoperative non-covering relationship to the window 236 and is anchored at a post 253 to the door 214 and connected to the blind 242 as indicated. A gear 254 is formed on a surface of an upstanding gear 256. The gear 256 is connected to a gear train (not shown) which is driven by the electric motor (not shown) previously mentioned in the camera, which when energized, also drives the spread rollers 210 and 212 for a suitable period of time. This gear 256 is supported for rotation on the flange 230 and is located in depending overlapping relationship to the upwardly projecting rack 246 so that a circumferentially extending gear segment 258 on the gear 254 will engage the teeth of the rack 246, as shown in FIG. 8. A rack engaging cam 260 and a recessed surface 262 are also formed circumferentially on the gear 254 between the ends of the gear segment 258.

The blind 242 is normally held in uncovering relationship to the window 236 by the spring 252 and the gear segment 258 of th gear 254 is engaged with the rack 246. When the gear 256 is rotated in the direction of the arrow in FIG. 8 by actuation of the motor, which is energized by pressing the camera's shutter button 58, it will move the rack 246 and the attached blind 242 over the window 236. This movement will continue until the rack is engaged by the cam 260 thereby holding the blind 242 in place for a predetermined time. Further clockwise rotation of the gear 254 (as viewed in FIG. 8) eventually moves the cam 260 out of engagement with the stationary rack thereby allowing the spring 252 to return the rack 246 to its original position. It will be apparent that when the drive to the gear rack 246 is energized, the blind 242 is moved to cover a portion of the window 236, prior to the exposed film unit emerging from the bite of the rollers, thus effectively increasing the length of the path that an exposed film unit 74 takes, as measured from the bite of the spread rollers 210 and 212, before it can be reached by light entering the viewing window 236. Thus, light-piping will not occur.

As described, this invention is applied to a camera of the instant type which receives film assemblages having stacked film units of the self-developing type. The camera is provided with a pair of spread rollers which engage an exposed film unit to spread a processing liquid between layers of the film unit while simultaneously moving it into a storage chamber having a viewing window. A shade, formed from an opaque material, for the window is located adjacent the exit side of the spread rollers. As the exposed film unit is moved into the storage chamber, the shade, in the preferred embodiment, is already in partial covering relationship to the right side of the window, as viewed in FIG. 8, and after a predetermined period of time is automatically returned to its non-covering position. This time is sufficient to allow the exposed and treated film unit to remain in the dark until its treated length reaches a predetermined value at which time it will not be affected by light. At this time the leading end of the film unit may move over the uncovered portion of the window since there will be no danger of light actinic to the exposed film unit being piped along the length of the film unit until it reaches an untreated portion of the film unit that is still at the entrance side of the spread rollers. Since the window is covered for only a short period of time, i.e., until the exposed film unit has emerged from the bite of the rollers 210 and 212, the operation is speeded as compared to prior art cameras where the window of the imbibition chamber must be covered until the full developing operation is completed.

Since certain changes may be made in the above-described apparatus without departing from the scope of the invention herein involved, it is intended that all matter contained in the above description or shown in the accompanying drawings shall be interpreted as illustrative and not in a limiting sense. For example, while the shade of the preferred embodiment has been described as being in partial covering relation to the window at the time that the exposed film unit starts to exit from the bite of the rollers, the movement of the shade toward the window could be timed to occur as the film unit starts to emerge from such bite, i.e., they could move as one.

What is claimed is:

1. An instant camera comprising:

means for supporting a film cassette containing a plurality of instant film units in position for their sequential exposure, each film unit including a transparent light transmissive outer layer having an opacifying system dispersed therein in an amount which is insufficient to adversely affect the normal photographic exposure of an underlying photosensitive layer but sufficient to reduce substantially the transmission of actinic light along the length of the film unit;

means for defining a storage chamber having a window through which an image in an exposed film unit located within said chamber may be viewed;

means for moving an exposed film unit from the cassette into said chamber, said moving means including a pair of rollers defining a bite for spreading a processing liquid containing an opacifying material between layers of an exposed film unit to initiate the formation of a visible image therein while simultaneously moving the film unit into said chamber and in superposition with said window;

opaque means mounted for movement from an inoperative position out of alignment with said window to an operative position wherein it covers only a portion of said window to thereby increase to a predetermined distance a path travelled by the exposed film unit, as measured between said bite of said par of rollers and the point at which the transparent light transmissive layer of the exposed film unit moves out of superposition with said opaque means and is struck by light entering said window, thereby rendering any light being subsequently transmitted along the length of the transparent light transmissive layer, after said predetermined distance has been travelled, non-actinic to areas of underlying portions of the photosensitive layer over which the processing liquid has, as yet, not been spread, said opaque means having an area less than that of said window; and means for returning said opaque means to said inoperative position after said predetermined distance has been travelled.

2. A camera according to claim 1 in which said opaque means is a blind in the form of a flat opaque member which is reciprocably mounted adjacent said window ahead of said spread rollers.

3. A camera according to claim 2 further including means for advancing said blind over said window prior to the leading end the treated film unit advancing over said window.

4. An instant camera comprising:

means for supporting a film cassette containing a plurality of instant film units in position for their sequential exposure, each film unit including a transparent light transmissive outer layer having an opacifying system dispersed therein in an amount which is insufficient to adversely affect the normal photographic exposure of an underlying photosensitive layer but sufficient to reduce substantially the transmission of actinic light along the length of the film unit;

means for defining a storage chamber having a window through which an image in an exposed film unit located within said chamber may be viewed;

means for moving an exposed film unit from the cassette into said chamber, said moving means including a pair of rollers for spreading a processing liquid containing an opacifying material between layers of an exposed film unit to initiate the formation of a visible image therein while simultaneously moving the film unit into said chamber and in superposition with said window, said spreading rollers and said window being spaced apart by a distance less than the length of the film unit;

opaque means mounted for movement from an inoperative position out of alignment with said window to an operative position wherein it covers at least a portion of said window to preclude actinic light incident upon said window from striking the transparent layer of the film unit until the processing liquid has been spread a predetermined distance lengthwise, thereby rendering any light being transmitted along the length of the transparent light transmissive layer after said predetermined distance non-actinic to areas of underlying portions of the photosensitive layer over which the processing liquid has, as yet, not been spread, said opaque means including a blind in the form of a strip of opaque material wound into a coil which is rotatably mounted adjacent and ahead of said spread rollers, said strip includes means on its leading end engagable by a leading end of an advancing film unit as it leaves said spread rollers to uncoil said strip;

means for releasing said engagable means to permit rewinding of said strip into said coil form; and means for returning said opaque means to said inoperative position after said predetermined distance has been reached.

5. A camera according to claim 4 in which said releasing means is located in position in said storage chamber to be engaged by said leading end of said blind after it reaches a predetermined position in covering relationship to said window.

6. A camera according to claim 4 in which the advancing exposed film unit advances over said opaque strip as it is uncoiled; said engaging means on said leading end of said strip includes a transverse upstanding shoulder on said leading end of said strip which will be engaged by the leading end of the film unit as it advances over said strip; and said releasing means comprises a cam which lowers said leading end of said strip to release said upstanding shoulder from the film unit.

7. An instant camera comprising:

means for supporting a film cassette containing a plurality of instant film units in position for their sequential exposure, each film unit including a transparent light transmissive outer layer having an opacifying system dispersed therein in an amount which is insufficient to adversely affect the normal photographic exposure of an underlying photosensitive layer but sufficient to reduce substantially the transmission of actinic light along the length of the film unit;

means for defining a storage chamber having a window through which an image in an exposed film unit located within said chamber may be viewed;

means for moving an exposed film unit from the cassette into said chamber, said moving means including a pair of rollers for spreading a processing liquid containing an opacifying material between layers of an exposed film unit to initiate the formation of a visible image therein while simultaneously moving the film unit into said chamber and in superposition with said window, said spread rollers and said window being spaced apart a distance less than the length of a film unit;

opaque means mounted for movement from an inoperative position out of alignment with said window to an operative position wherein it covers at least a portion of said window to preclude actinic light incident upon said window from striking the transparent layer of the film unit until the processing liquid has been spread a predetermined distance lengthwise, thereby rendering any light being transmitted along the length of the transparent light transmissive layer after said predetermined distance non-actinic to areas of underlying portions of the photosensitive layer over which the processing liquid has, as yet, not been spread, said opaque means being a blind in the form of a flat opaque member which is reciprocably mounted adjacent said window ahead of said spread rollers;

means for returning said opaque means to said inoperative position after said predetermined distance has been reached; and means comprising a rack and gear unit for advancing said blind over said window prior to said leading end of said treated film unit advancing over said window.

8. A camera according to claim 7 further including means for rotating said spread rollers and said gear unit simultaneously.

9. A camera according to claim 8 in which said gear has rack-engaging teeth for a certain portion of its circumference and a cam portion with no teeth for a part of its circumference.

10. A camera according to claim 9 in which the teeth of said rack are formed on the upper edge of a rack member upstanding from said blind; and said timing gear unit is carried on an upstanding rotatable disc which overlaps said upstanding rack member.

* * * * *